Aug. 4, 1931.  G. W. WILLIAMS, JR  1,817,281
AUTO VENT WING FOR AEROPLANES
Filed Feb. 24, 1930    3 Sheets-Sheet 1
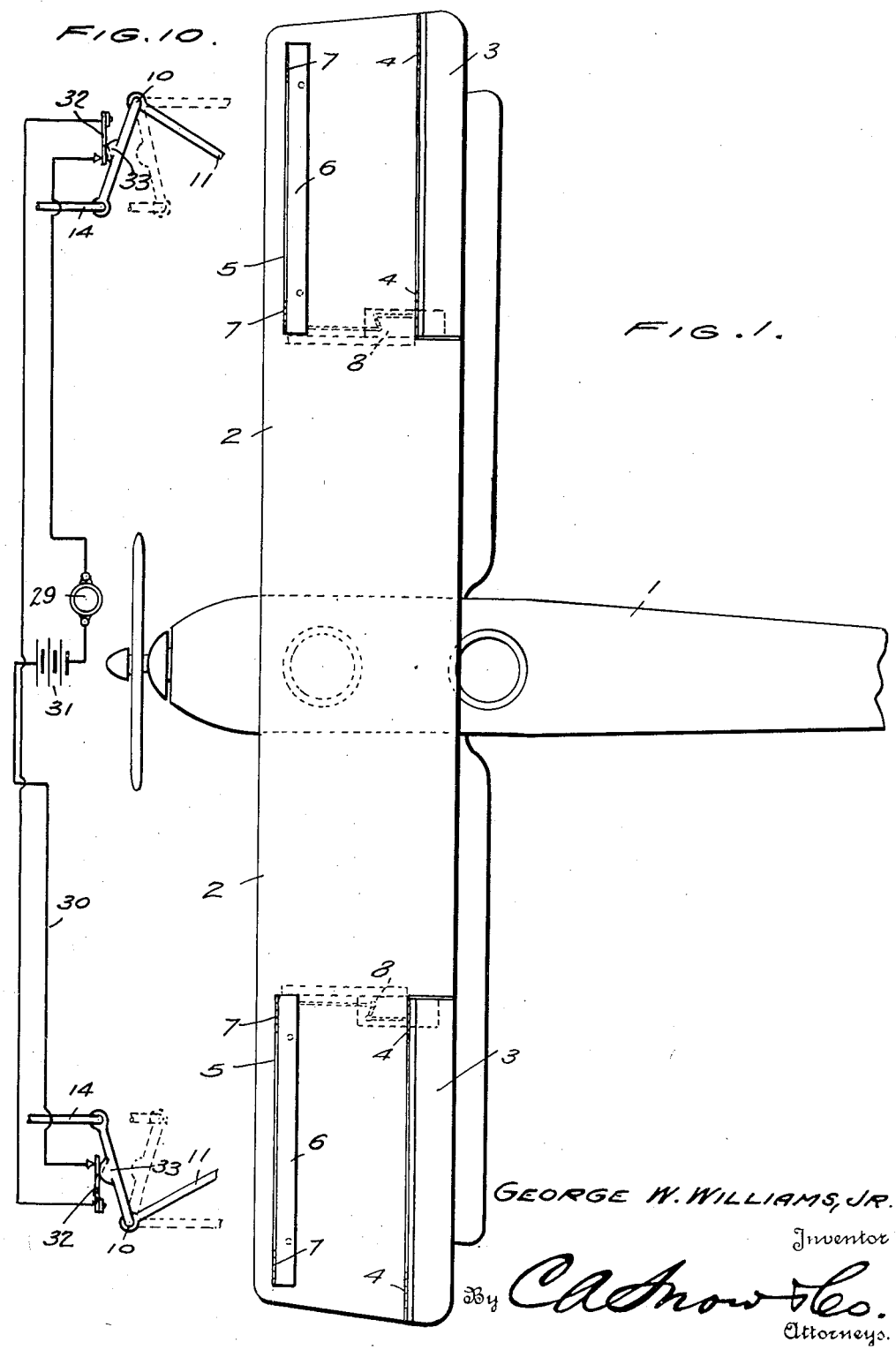
GEORGE W. WILLIAMS, JR.
Inventor
By CA Snow & Co.
Attorneys.

Aug. 4, 1931.   G. W. WILLIAMS, JR   1,817,281
AUTO VENT WING FOR AEROPLANES
Filed Feb. 24, 1930   3 Sheets-Sheet 2
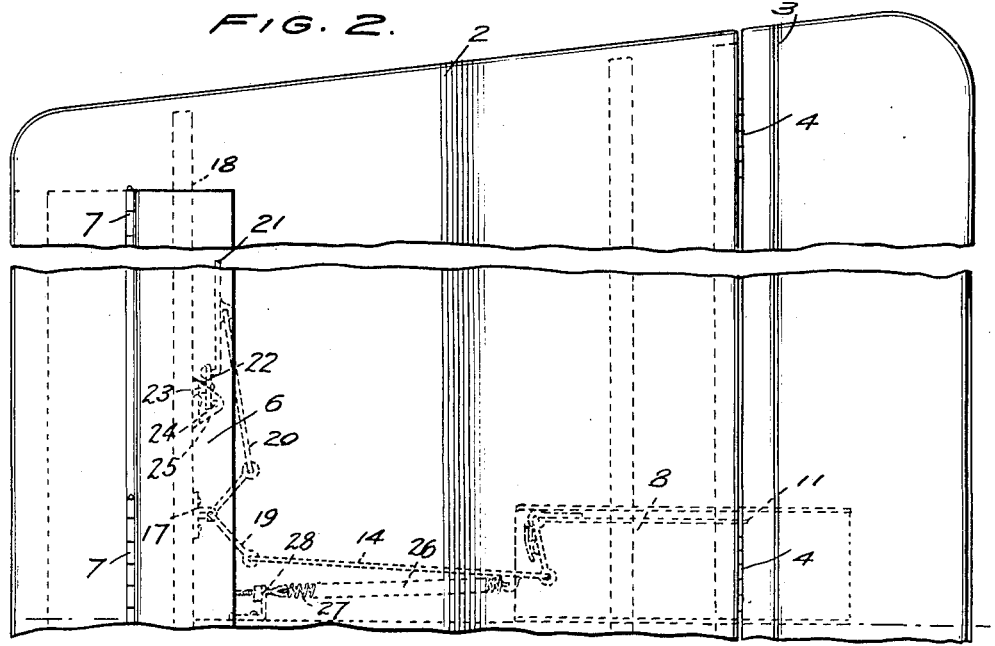
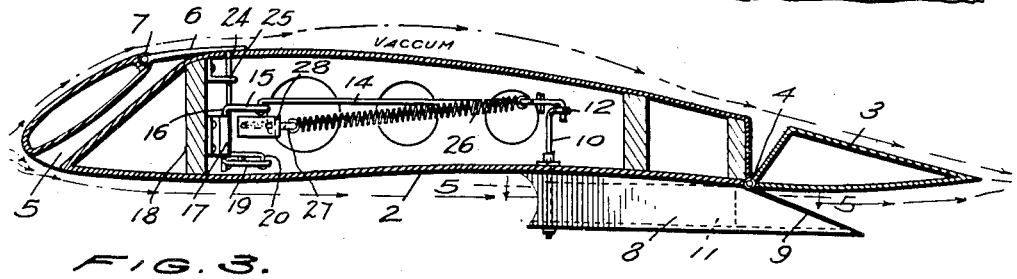
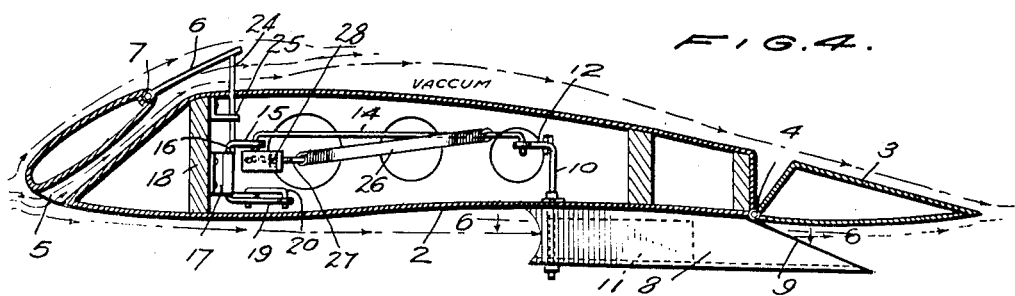
GEORGE W. WILLIAMS, JR.
Inventor
By C. A. Snow & Co.
Attorneys.

Aug. 4, 1931. G. W. WILLIAMS, JR 1,817,281
AUTO VENT WING FOR AEROPLANES
Filed Feb. 24, 1930  3 Sheets-Sheet 3
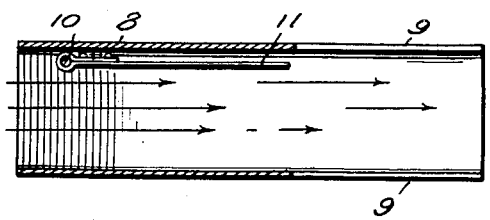
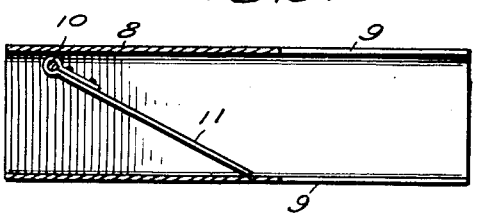
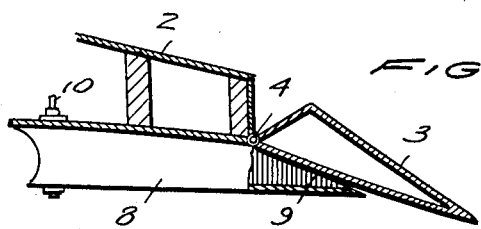
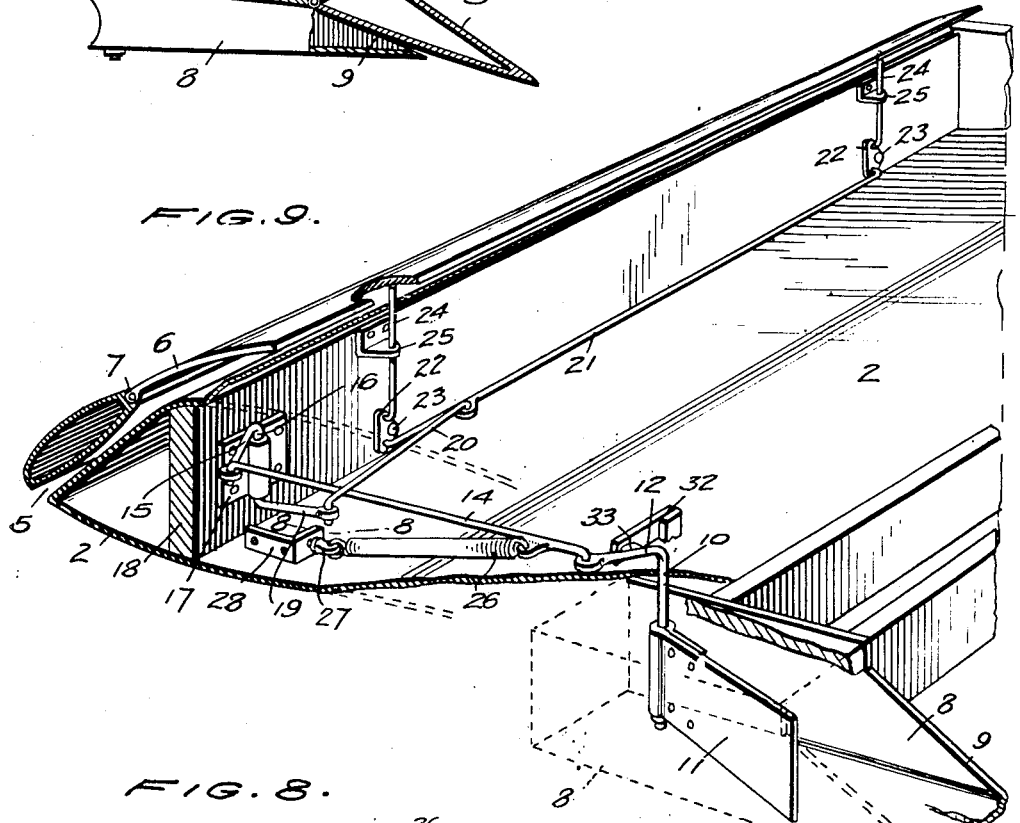
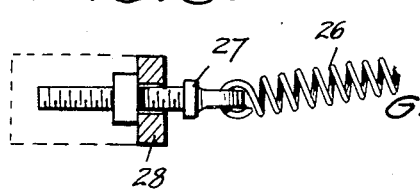
GEORGE W. WILLIAMS, JR
Inventor Patented Aug. 4, 1931

1,817,281

UNITED STATES PATENT OFFICE

GEORGE W. WILLIAMS, JR., OF TEMPLE, TEXAS; PAULINE WILLIAMS EXECUTRIX OF SAID GEORGE W. WILLIAMS, JR., DECEASED

AUTO VENT WING FOR AEROPLANES

Application filed February 24, 1930. Serial No. 430,978.

The device forming the subject matter of this application is a non-stalling, non-spinning mechanism for aeroplanes, and the invention resides in the combination of parts hereinafter described. Since the principles of the device are clearly set forth, the mechanical details may be changed within the scope of what is claimed, without departing from the spirit of the invention.

In order to explain fully the advantages of the device hereinafter described, it will be necessary to review what has been accomplished along the line of the present invention, the improvement thereby being made the more clear.

In a known construction, a slotted wing is provided, and has a recess along the upper side of the leading edge of the wing. A hinged member is fitted into the recess, and when the hinged member automatically moves forward, a slot is formed in the leading edge of the wing in such a manner as to effect a change in the airfoil section, and retard the burble point, or break in the air flow over the wing, thereby prolonging the lift of the wing.

It is well known that when an aeroplane wing reaches a certain slow speed in flight the air flow over the wing breaks up into eddies and whirlpools, thereby destroying the vacuum or lifting force on the upper surface of the wing. Therefore, the aforesaid automatic slot-producing mechanism was provided, and was arranged to come into play when the aforesaid slow speed point was reached, thereby enhancing the lifting force of the wing at slow speed. The plane, therefore, is given a slower landing speed, and in the event of falling off into a spin, an extra lifting force is given to the wing on the inner circle of the spin, the machine being caused to right itself, and the spin being terminated.

In order to improve devices of the sort hereinbefore mentioned, the present application discloses a wing which, in place of a crude slot, has a rearwardly tapered Venturi opening, means being provided whereby an even, forced flow of air through the Venturi opening will take place at precisely the proper moment, to wit, just as the plane reaches the stalling speed. The invention aims, moreover, to provide a closure for the said Venturi opening, which is operated entirely by the air flow through a vane housing, the air flow through the vane housing being affected by two distinct causes, namely, the speed of the aeroplane, and the throttling for damping effect produced when the ailerons are brought into use.

In the accompanying drawings:

Figure 1 shows in top plan, an aeroplane equipped with the device forming the subject matter of this application;

Figure 2 is a top plan showing a portion of the wing on an enlarged scale;

Figure 3 is a section through the wing showing the parts as they will appear when the damper for the Venturi passage is closed;

Figure 4 is a view similar to Figure 3, but showing the damper opened;

Figure 5 is a section on the line 5—5 of Figure 3, the vane being opened;

Figure 6 is a section on the line 6—6 of Figure 4, the vane being in closed position;

Figure 7 is a section showing the aileron lowered so as to effect a practically complete closure of the vane housing;

Figure 8 is a sectional view disclosing one of the adjusting devices for the springs;

Figure 9 is a perspective view disclosing a portion of a wing and parts associated therewith, portions being broken away;

Figure 10 is a diagram of the signal circuit.

The numeral 1 designates an aeroplane, the wings of which are marked by the numeral 2. The ailerons 3 are hingedly mounted at 4 on the wings 2. The wings 2 are supplied near to their ends and near to their leading edges, with upwardly inclined, rearwardly extended Venturi passages 5, which may be of any desired length considered relatively to the length of the ailerons 3. The passages 5, called Venturi passages, taper in width from their forward ends to a place near to their rear ends, and the utility of this construction will be made manifest hereinafter. The flow of air through the passages 5 is controlled by dampers 6, located at the upper rear ends of the passages, and hinged to the wings ahead of the passages 5.

Tubular housings 8 are secured to the under side of the wings 2. The rear ends of the housings 8 are located under the ailerons 3 and are open and beveled off, as shown at 9. Shafts 10 are journaled in the housings 8 and extend up into the wings 2. Each shaft 10 carries a rearwardly extended vane 11, located in the housing 8. On the upper end of the shaft 10, there is a crank arm 12 disposed in the wing 2. Forwardly extended links 14 are pivoted to the arms 12 and are pivoted to arms 15 on the upper ends of shafts 16 journaled in bearings 17 on a partition 18 in the wings 2, the shafts 16 being provided at their lower ends with arms 19 to which are pivoted second links 20. The links 20 are pivoted, each, to a connection 21 in the form of a rod having its ends pivoted to levers 22 of the first order, fulcrumed at 23 on the partition 18. Plungers 24 are pivoted to the levers 22 and slide in guides 25 on the partition 18, the plungers operating beneath the dampers 6, to open the dampers and to permit the dampers to close.

Retractile springs 26 are connected to the links 14 and are held by adjusting devices 27 (which may be eye-bolts with nuts) upon anchors 28 carried by any accessible part of the plane structure.

It will be clear from Figure 9 that the means for opening the dampers 6 embodies the vanes 11, the shafts 10, the arms 12, the first links 14, the arms 15, the shafts 16, the arms 19, the second links 20, the connections 21, the levers 22, and the plungers 24.

The springs 26 are adjusted by the devices 27 of Figure 8, so that when the machine reaches flying speed, the vanes 11 will assume a position parallel to the air flow through the housings 8, as shown in Figure 5, thereby causing the damper 6 to close the upper end of the passage 5, as disclosed in Figure 3. The passage 5 will remain closed by the damper 6 so long as the machine has normal flying speed, but as the flying speed is lost, or as the minimum burble point is reached, the springs 26 will swing the vanes 11 into the position of Figure 6, across the line of the air flow through the housings 8. The vanes 11 assume the position of Figure 6 under the conditions stated because the tension of the springs 26 is greater than the rearward pressure of the air in the housings 8.

When the dampers 6 open, as shown in Figure 4, the air moves through the Venturi passages 5. The burble action of the air over the wings 2 is retarded, and the lift of the wings will be maintained, even at slower speed than actual normal flying speed.

In devices of the general kind under discussion, as heretofore constructed, two conditions would cause the mechanism to function; namely, the loss of flying speed, and too high an angle of attack or climbing angle. In the device forming the subject matter of this application the ailerons 3 have a function in opening or closing the dampers 6. Figures 3, 4, and 7 show that the vane housings 8 extend rearwardly under and part way across the ailerons 3. In flight, when one of the wings 2 drops, and it is desired to raise it again to a normal position, the corresponding aileron 3 is pulled down. When the aileron 3 is pulled down, it partially closes the rear end of the vane housing 8, as shown in Figure 7, and automatically slows down the air flow through the housing. The vane 11, which is held parallel to the line of flight by the force of the air, returns toward the position of Figure 6, and causes the damper 6 to open with respect to the corresponding passage 5.

When the passage 5 is opened as in Figure 4, the wing is given an increased lift and returns to normal position more quickly than would be possible if the aileron 3 were relied upon alone. It will be obvious from the foregoing, that in addition to its common function, the aileron 3 cooperates with the damper 6 to such an extent that it will be practically impossible for the machine to go into a tail spin. From the foregoing, it will be obvious that should flying speed be lost, and the machine start into a spin, the Venturi passage 5 will be opened automatically and the lift at the tip of the wing will be increased. When one wing begins to drop, it automatically increases its lift compared with the lift of the opposite wing, and there is an immediate tendency to restore the aeroplane to a righted position. The righting force may be increased by the use of the aileron as hereinbefore explained, and the wing brought back to level. In the present machine, there exists a condition different from that found in an ordinary aeroplane. In an ordinary aeroplane, the mere dropping of the wing will cause the angle of attack to increase the stalling point, and the lift will fall off, instead of increasing, so that the effort to lift the depressed wing by the use of the aileron would do no more than to aggravate the existing condition, by further reducing the lift and increasing the drag on the low wing.

It is evident that even though the plane has lost flying speed and is settling rapidly at a large angle of attack, the altitude of the plane is still under the control of the pilot, and even though a wing should settle, it can be brought up simply by the aileron, because the aileron has an added function flowing from the position of the parts shown in Figure 7. In a normal flight, the airfoil is smooth and unbroken over the entire area of the wing, as shown in Figure 3; but when a high angle of attack occurs, the air-foil is disturbed and is full of whirlpools and eddies, the lift of the wing being destroyed accordingly. Figure 4 shows the airfoil when the damper 6 is open with respect to the passage 5, and the air screen proceeding through the passage 5, has completely combed out the eddies and restored the lift, even at a high angle of attack. When a stall occurs, or when the aeroplane loses flying speed, the action is exactly the same as in the high angle of attack, the passage 5 being effective, therefore, both in stalled flight, and in the event of acquiring too steep a climbing angle.

The improvements described up to this point embody structural details, such as the damper 6 and the means for operating it; and other improvements, such as the substitution of the Venturi passage 5 for the ordinary slot or hinged flap. In the device forming the subject matter of this application, an even contour of the wing section is preserved at all times, and there is no disturbance of the air, to form eddies, when the damper 6 is opened as in Figure 4. It is a matter of common knowledge that with hinged flaps and the like, eddies are produced about the trailing edge of the hinged flaps, the effectiveness of such a device being destroyed to a great extent.

The flow of air through the Venturi passage 5 is pronounced, due to the suction created in the throat of the passage, the effectiveness of the passage being increased. The action of the Venturi passage 5 is controllable automatically by the action of the aileron. To illustrate: when the aileron is used, in normal flight, and full flying speed is being maintained, the aperture or passage 5 will not function, due to the fact that the air flow through the vane housing 8 is sufficient to keep the vane in the position of Figure 5; but should a sharp turn be made, the wing on the inner side of the circle of the turn would slow up as compared with the wing on the outer circle. As the wing on the inner side of the circle reached the stalling point, or, rather, fell below actual flying speed, its first inclination would be to drop. By pulling the aileron down, the air flow through the vane housing 8 would be slowed up, due to the damping effect caused by the partial closing of the rear end of the vane housing, as in Figure 7, the passage 5 being opened, and the lift of the wing being restored in the manner hereinbefore explained. On the other hand, should it be desired to land the aeroplane, and if the aeroplane were brought down on an even field, the use of the ailerons would be unnecessary. As soon, however, as the machine reached a normal stalling speed, the air flow through the vane housing 8 also would slow up to such an extent as to cause the vane to operate. This would give added lift to the wings at slow speed, and enable the machine to land much more slowly than would be possible otherwise.

In order to prevent accidental stalling of the aeroplane, I install a signal 29, which may be audible or visible, in any desired place which is convenient for the person piloting the plane. The signal 29 is located in an electrical circuit 30, and a source 31 of electrical energy is interposed in the circuit 30. Switches 32 are interposed in the circuit 30 and may be operated by projections 33 on the arms 12 of the shafts 10. The construction is such that when both of the vanes 11 swing from the dotted line position of Figure 10 to the solid line position, the circuit 30 will be closed, and the signal 29 will be operated. So long as the machine is in a normal flying position, one switch might be satisfactory, but in the event of a turn, the wing on the inner side of the circle will be slower than the one on the outer side of the circle, and the signal will operate whilst the machine still has flying speed. It is in order to eliminate this fault of operation that two switches, as at 32, are provided, it being necessary for both of the vanes 11 to operate in order that the signal 29 may become effective. This principle can also be applied to present air-speed indicators, since the device under discussion is in effect a one-point air-speed indicator.

What is claimed is:—

1. An aeroplane wing having a passage, means for opening and closing the passage, and mechanism for actuating said means, said mechanism embodying a vane housing, and a vane operating in the housing.

2. An aeroplane wing having a passage, a housing on the plane, means for opening and closing the passage, mechanism for operating said means, said mechanism comprising a part in the housing and actuated by air moving through the housing, and an aileron on the plane and movable to and from the housing to regulate the passage of air through the housing.

3. An aeroplane wing having a passage, a hinged damper controlling the passage, a vane housing on the plane, and through which air may pass, an air-operated vane in the housing, and mechanism connected to the vane for operating the damper.

4. An aeroplane wing having a passage, a damper controlling the passage, a vane housing on the plane and through which air may pass, an air-operated vane in the housing, mechanism connected to the vane for operating the damper, spring means coacting with the vane to hold it in a position transverse to the air moving through the housing, and mechanism for adjusting the spring means.

5. An aeroplane wing having a passage, a damper controlling the passage, a vane housing on the plane and through which air may pass, an air-operated vane in the housing, mechanism connected to the vane for operating the damper, and an aileron on the plane, the aileron being movable to and from the housing to govern the passage of air through the housing.

In testimony that I claim the foregoing as my own, I have hereto affixed my signature.

GEORGE W. WILLIAMS, Jr.